June 16, 1936.  C. K. ROOS  2,044,401
CORE COMPOSITION AND METHOD OF MANUFACTURING SAME
Filed Aug. 15, 1929  2 Sheets-Sheet 1
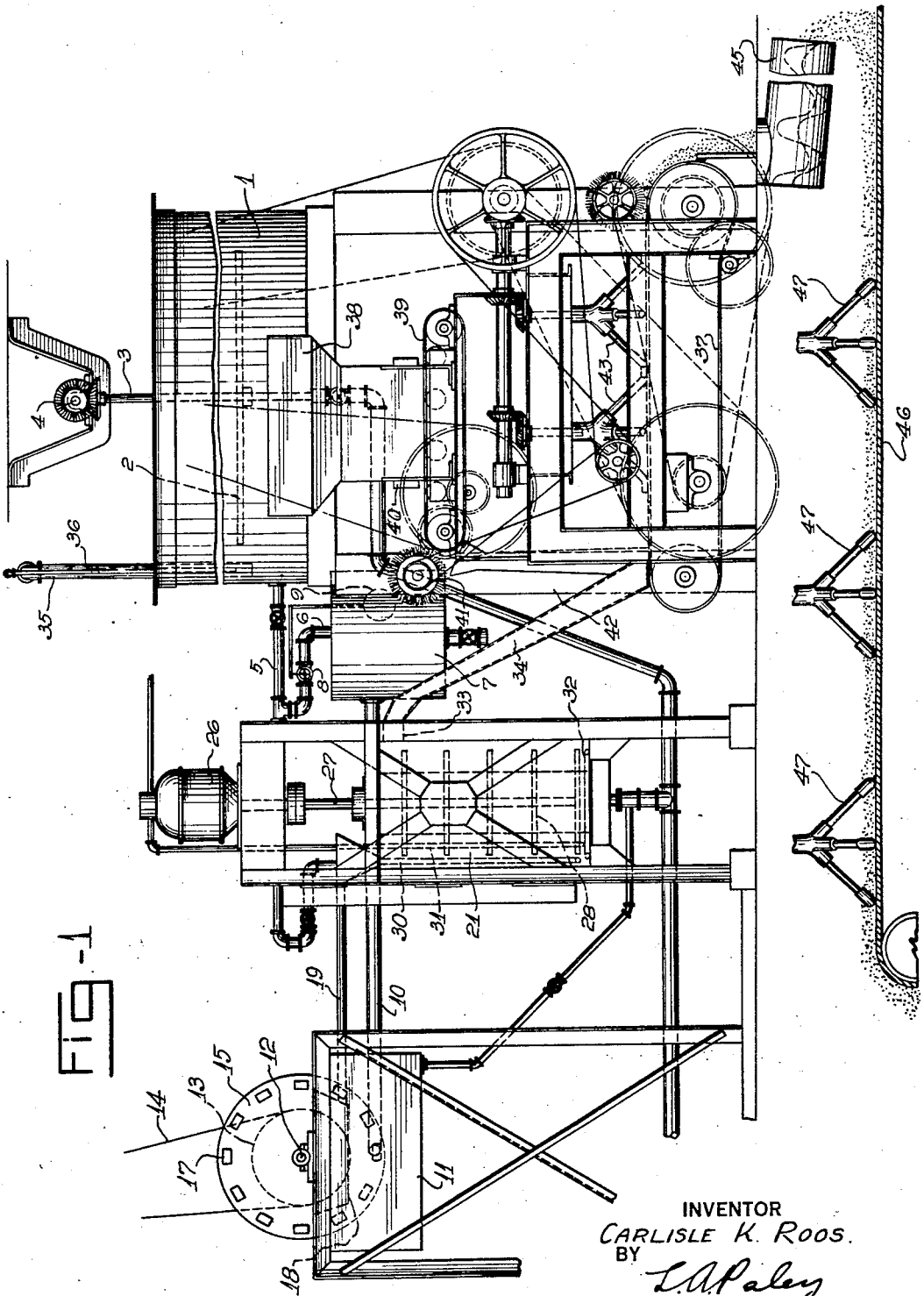
INVENTOR
CARLISLE K. ROOS.
BY
L. A. Paley
ATTORNEY

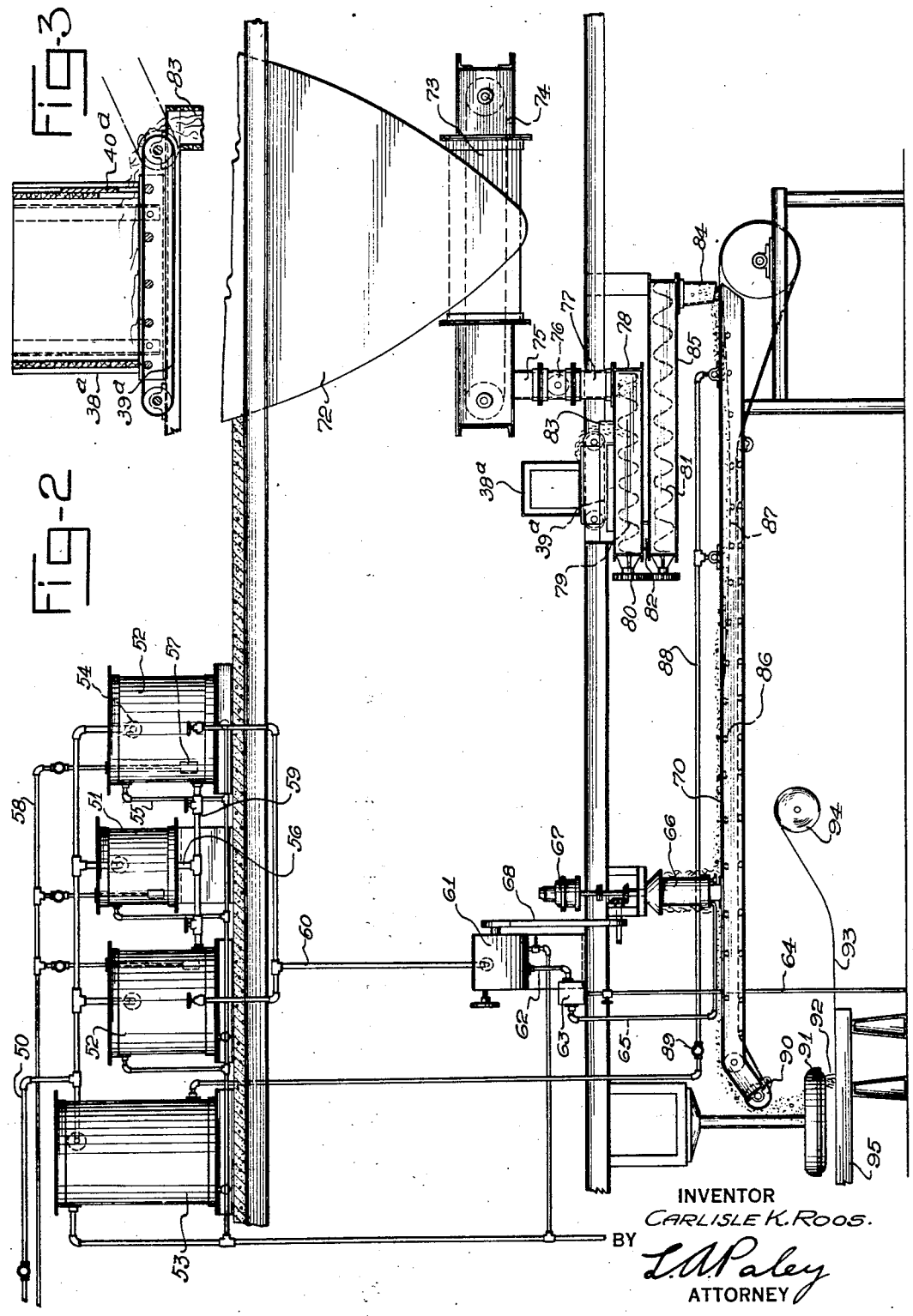
June 16, 1936.     C. K. ROOS     2,044,401
CORE COMPOSITION AND METHOD OF MANUFACTURING SAME
Filed Aug. 15, 1929     2 Sheets-Sheet 2
INVENTOR
CARLISLE K. ROOS.
BY L. A. Paley
ATTORNEY Patented June 16, 1936

2,044,401

UNITED STATES PATENT OFFICE 2,044,401

CORE COMPOSITION AND METHOD OF MANUFACTURING SAME

Carlisle K. Roos, Wheaton, Ill., assignor to United States Gypsum Company, Chicago, Ill., a corporation of Illinois Application August 15, 1929, Serial No. 386,189

9 Claims. (Cl. 154—21)

This invention relates to a composition for the cores of plasterboards and other molded articles, and also relates to the process of making said core composition or other molded products.

This application is a continuation in part of my copending applications, Serial No. 733,197, filed August 20, 1924, now Patent No. 2,017,022, October 8, 1935, Serial No. 3,477, filed January 19, 1925, and Serial No. 142,155, filed October 16, 1926.

In the aforementioned copending applications, I have described the manufacture of cementitious core material, preferably composed of gypsum slurry in which has been mixed a light weight, permanent foam for the purpose of causing the resulting set composition to be light in weight and have a high heat insulating value. I have also described the novel idea of using paste, dextrine or other adhesive or mucilaginous materials in the composition to improve the properties of the mixture. The present application is specifically directed to the addition of these adhesive materials to the composition in addition to the foam or other density reducing agent so that a better bond is obtained between the core composition and the paper cover sheets thereto.

In the manufacture of light weight core material for plasterboards or the like, various methods are followed for obtaining the low density, cementitious, composition material. As above noted, my preferred method of securing this light weight composition is to mix a fluid light weight, stable foam with the slurry containing gypsum or other cementitious material. It has also been proposed to mix in various gels containing water, such as paper pulp gel or cooked starch gel. However, regardless of the type of low density agent added to the composition, I have found that an additional adhesive agent should be added to the composition since otherwise the bond between the composition and its paper cover sheets will be so weak that peeling of the paper cover sheets from the core will frequently result. This peeling of the cover sheets has even been noted when cooked starch gel has been used to reduce the density of the composition. While cooked starch in itself is supposed to be an adhesive, it is found to be inefficient when used in a core composition containing gypsum without an additional adhesive agent to prevent peeling of the cover sheets, especially with highly calendered and close grained paper.

An object of this invention, therefore, is to provide a core composition for manufactured board having a cementitious core material and paper cover sheets in which a suitable adhesive is added to the core mixture in addition to the density reducing agent, so as to insure proper bonding of said cover sheets to the core material.

Another object of the invention is to provide a suitable method and apparatus for incorporating the adhesive in the core composition; also to improve core compositions and their method of and apparatus for manufacture in other respects hereinafter specified and claimed.

Reference is to be had to the accompanying drawings forming a part of this specification, in which Fig. 1 is a diagrammatic sectional elevation of one form of apparatus for carrying out the method of the invention and incorporating the adhesive material in the core material.

Fig. 2 is a diagrammatic sectional elevation of a modified form of apparatus for incorporating the adhesive material in the core composition, and Fig. 3 is a sectional elevation of the powdered adhesive feeder used in the apparatus shown in Figs. 1 and 2.

The proper selection of an adhesive for increasing the bond between the gypsum core composition and the paper cover sheet is especially important. I have found that the addition of farinaceous material such as dextrinized carbohydrate paste, is suitable for this purpose. One suitable paste is a type of a corn flour paste and is sold in commerce as a dry powder, being obtained by passing the "grits" from corn through a combination screw conveyor and heater which has a heating steam jacket to heat the "grits" for a period of 1 hour, the steam in the jacket being maintained at a pressure of 60–100 pounds per sq. in. These heated "grits" are then put into flake form by passing between a scraper knife and a roll heated to 250°–300° F. by the friction due to breaking up the "grits". The total process of heating the corn "grits", causes a small portion of same to be dextrinized. The resulting flakes are then ground up to form the paste which I prefer to use. This resulting paste powder may have the following compositions:

| | One suitable paste powder | Another suitable paste powder |
|---|---|---|
| | Percent | Percent |
| Water | 5.6 | 4.1 |
| Ash | 0.4 | 0.3 |
| Crude protein | 9.1 | 9.1 |
| Fat | 0.7 | 0.7 |
| Crude fiber | 0.5 | 0.4 |
| Water soluble matter | 20.15 | 25.79 |
| Insoluble starch | 56.61 | 53.88 |
| Water soluble starch and dextrine calculated as starch | 18.31 | 23.63 |
| Reducing sugars | 0.12 | 0.15 |
| Non-reducing sugars calculated as sucrose | 0.26 | 0.35 |

It should be understood that certain uncooked flours may be mixed with water and used as an adhesive in my composition. However, these flours are not as effective for my purpose as the partially dextrinized material. The preferred corn flour pastes described above also serve to stabilize the foam and make it more permanent and lasting.

In the preferred method of mixing the paste with the stucco, I use the paste in dry powdered form and mix same with the dry stucco prior to the mixing of water with the stucco-paste mixture. The starch in the dry paste will not form a gel with cold water until it has stood for at least twenty-four hours or longer, and owing to the fact that the paste is immediately mixed with the stucco and the stucco sets hard within about six minutes, no gel is formed from the mixture of the starch contained in the paste and water, and therefore no detrimental effect with respect to bond between the core composition and the cover sheets of the plasterboards is produced from any substantial starch gel formation. The paste which I prefer has unique properties in that the water soluble starch and dextrine noted in the above reported analysis has a property of migrating to the surface of the core so that these most adhesive, water soluble constituents are located through migration at the interface between the core composition and the paper, where they are free to mix with the fibers of the paper at a point where they are most needed to give a very strong bond with a high factor of safety between the paper cover sheet and the core. These water soluble constituents of the paste are principally dextrines, but also include some of the reducing sugars and the non-reducing sugars.

In the apparatus shown in the drawings, the foam for incorporation in the stucco mix is first produced and the dry paste is then mixed with the foam. This foam-paste mixture is now mixed with the water-stucco slurry which is suitable for the manufacture of the core composition used in plasterboard.

In the form of the apparatus shown in Fig. 1, two or more solution tanks 1 are each provided with slowly moving agitators 2 on a vertical shaft 3 which is operated from an overhead power shaft 4. Tanks 1 are connected by pipes 5 which unite in a branch 6 emptying into a smaller tank 7 arranged at a lower level therebetween, the branch 6 having a valve 8 operated by a float 9 in said tank 7. The tank 7 is connected by an inclined pipe 10 to a feeder tank 11 on which is mounted a rotating shaft 12 connected by a pulley 13 and belt 14 to an overhead power shaft, not shown. The shaft 12 carries two discs 15 rotating within the feeder tank, each of which carries a plurality of small radial cups 17 facing in the same direction upon one side thereof near the periphery adapted to empty into drip pan 18 arranged thereunder. The drip pans are each connected by inclined pipe 19 to foam generator cells 21.

An electric motor 26 is preferably arranged above each cell 21, said motor operating a central, vertical impeller shaft 27. Each impeller shaft preferably carries a plurality of circular discs 28 for whipping the solution into foam. Any suitable type of whipping devices may be used in the cells 21. A feeder pipe 30 is arranged in each cell, discharging near the bottom thereof and provided at its upper end with a funnel into which the feeder pipe 19 empties. An air pipe 31 from a source of compressed air not shown, is provided with branches leading to the bottom of each cell, terminating in a ring-shaped air jet 32 below the impeller shaft. The inside top of each cell 21 is provided on the side adjacent to the mixing device hereinafter described, with a discharge opening 33 leading to a chute 34 for said mixing device. The solution tanks 1 and likewise the foam generating cells 21, as well as the drip pans on the feeder tank, are preferably arranged in pairs and so connected by piping which is provided with suitable valves as shown, so that normally but one unit is operated at a time. Thus any one of the solution tanks or foam generating cells on the smaller float valve tanks may become out of order from any cause and the other tank or cell or connection to the tank or cell could be readily connected without stopping the formation of the mixture. A solution pipe 35 and steam pipe 36 form a conveying means leading from a source of supply not shown.

The foam mixing device is preferably located in line with the solution tanks 1 and in front of one of the foam generator cells. This device comprises an endless conveyor belt 37 passing over pulleys at each end, said belt being driven through a suitable train of belts and pulleys or chains and sprockets from the power shaft 4 overhead. The chute 34 from the foam generator cell 21, discharges upon the upper side of this belt 37 near the end adjacent the generator cells. An adhesive bin 38 is supported above an endless conveyor belt 39, the latter being superimposed upon and parallel to the endless belt 37 and traveling in a direction opposite to the direction of travel of said belt 37, the motion of belt 39 being imparted by a train of pulleys and belts driven from the main driving shaft 4. The bin 38 is furnished with a gate 40 which allows the contents of the bin to be continuously moved therefrom in a layer on belt 39. A cylindrical wire wheel 41 is arranged to brush the end of belt 39 adjacent to the foam generator cells and is caused to rotate by suitable belts and pulleys from the driving shaft 4. The paste or other adhesive brushed from belt 39 by brush 41, falls down chute 42 onto the belt 37 alongside of the foam which is also deposited through chute 34. A plurality of slowly moving agitator fingers 43 are arranged to rotate above the upper surface of the lower belt 37 through suitable gearing from the overhead shaft 4.

The fingers 43 thoroughly mix the foam and powdered adhesive on the belt 37, and the latter discharges this foam-adhesive mixture into the upper end of a spiral or screw conveyor 45 which in turn discharges this mixture upon a continuously moving mixer belt 46 to which has previously been supplied, by a means not shown, gypsum stucco and water. Mixer fingers 47 rotated from driving means not shown, rotate above the belt 46 and serve to thoroughly mix the foam-adhesive material with the stucco-water material. After being mixed on belt 46, the finished core composition is discharged from said belt onto a moving paper cover sheet, not shown, in a manner well known to the art. An upper cover sheet is applied and the plastic board rolled out flat and allowed to set to solid form to form the plasterboard of commerce.

This setting of the core composition takes place within a short period and before any of the starch gel has time to form while the paste is in contact with the water contained in the composition. When the paste is mixed in the core composition in the above described manner, it has approximately double the adhesive value that cooked starch has. The paper cover sheet thus firmly adheres to the core composition with a large factor of safety and no peeling of the paper cover sheets take place during subsequent shipment and use of the plasterboard.

In the modified form of the apparatus shown in Fig. 2, the paste or other powdered adhesive is mixed with the dry powdered stucco, this mixture is treated with water in a soak belt, foam or other weight reducing aggregate may or may not, as desired, be added to this wet stucco-adhesive mixture, and the entire mixture is then thoroughly mixed in a special mixing machine prior to application to the paper cover sheets of the board. This sequence of mixing operations is preferable to that previously described in that a more uniform and homogeneous mixture in the composition is obtained and because of the fact that the paste is used more efficiently. In this form of apparatus, water for use in preparing the foam solution is supplied through pipe 50 to concentrated solution tank 51 and dilute solution tanks 52. Pipe 50 is also connected to a water tank 53 which supplies water to the soak belt to be hereinafter described. Each of the inlet pipes for tanks 51 and 52 is provided with a float valve 54 for controlling the level of water in said tanks, and said tanks are also provided with overflow pipes 55 and drain pipes 56. The tanks 51 and 52 are preferably provided with heaters 57 supplied with steam through pipes 58 so that the foam solution may be heated up when necessary. Various agents are used for preparing the foam, such as soap bark, rosin soap, casein and the like.

After the concentrated foam solution is made in tank 51, it is run into tank 52 through connecting pipe 59. The dilute solution from dilute solution tank 52 passes through pipe 60 to solution feeder 61 of the rotating cup type as previously described in the apparatus shown in Fig. 1. The measured solution for making the foam passes from the feeder 61 and through pipe 62 to a mud trap 63 which is for the purpose of removing any sediment from the solution, this sediment being removed through pipe 64 to any suitable discharge point. The foam solution now passes from trap 63 through pipe 65 to the foam cell 66 where suitable beater or whipping mechanism is provided, the same being driven at a high rate of speed by means of a motor 67. By a suitable gearing, such as belt 68, the cup feeder 61 is actuated from motor 67. The foam from foam cell 66 flows from said cell onto a conveyor belt 70.

The powdered stucco composed of calcined gypsum is supplied from the storage bin 72 which preferably has a conical bottom terminating in a drag conveyor housing 73. A drag conveyor 74 passes through the bottom of hopper 72 and housing 73 and deposits a steady stream of stucco into discharge chute 75. Several of these discharge chutes 75 from a plurality of hoppers 72 may discharge into a transversely extending screw conveyor 76 which in turn discharges through a chute 77 into a screw conveyor housing 78. A screw conveyor 79 is rotatably mounted in the housing 78, being suitably driven by any driving means such as gear 80, and a second screw conveyor 81 is located below the screw conveyor 79, the two screw conveyor housings being connected by a duct 82.

Located above the screw conveyor 79 is a powdered adhesive hopper 38a, similar to hopper 38 and having a conveyor belt 39a passing through the bottom thereof, a suitable gate 40a being provided in the forward end of hopper 38a to permit the discharge of powdered adhesive onto the belt 39a. This powdered adhesive is discharged from belt 39a into a duct 83 which leads into the upper end of screw conveyor housing 78. The rotation of the screw conveyor 79 serves to thoroughly mix the dry stucco with the dry paste or other adhesive, this mixing operation being completed by the screw conveyor 81. These conveyors 79 and 81 are preferably of the ribbon type so that a vigorous mixing action is obtained. A duct 84 leads from the housing 85 containing the screw conveyor 81 and said duct discharges the stucco-adhesive mixture onto the belt 70.

The upper reach of belt 70 is supported upon transversely extending rollers 86, said rollers being depressed below the normal plane of the belt 70 to form a pocket 87 which is also channel-shaped laterally to form a trough for holding water supplied from tank 53 through pipe 88. A suitable level of water in the soak belt or pocket 87 is provided by control of the valve 89 on pipe 88.

The stucco-paste mixture is thus caused to pass downwardly into pocket 87 below the level of the water, and on emerging from this pocket, the excess water drains back into the pocket so that the wet stucco-paste mixture passes forwardly until it receives the foam from foam cell 66. The forward end of belt 70 passes around a pulley 90 which is located above a mixer 91 of any suitable type, the composition being thoroughly mixed in said mixer. This mixer 91 discharges through spout 92 to a continuously moving paper bottom sheet 93 which unwinds from a roll 94. The bottom sheet 93 passes over a table 95 which is located immediately below the mixer 91. After leaving the mixer 91, the top cover sheet of paper is applied to the top of the composition by an apparatus not shown and the resulting plasterboard consisting of a core composition containing the adhesive, and cover sheet on each face thereof is rolled flat and the board allowed to set to solid form, after which it is cut to lengths and dried in a drying kiln.

While the beneficial effects of the paste are more pronounced when same is used in combination with density reducing agents, the latter may be omitted from the composition if desired. Aggregates such as rock, sawdust, wood fiber, cork dust, slag, pumice, intumescent porous materials, etc. may be added to the composition if desired.

By the terms "partially dextrinized adhesive," "gelable starchy adhesive," "farinaceous adhesive material," "modified corn flour containing substantial amounts of dextrine," "dextrinized adhesive material," "partially dextrinized farinaceous gelable adhesive," "partially water soluble farinaceous adhesive material," "modified corn flour," and similar terms as used in the claims and specification, it is to be understood that they are intended to comprehend within their scope any farinaceous material that has been subjected to such temperatures that only a minor but a substantial proportion of the material has been dextrinized or converted to dextrine, or any farinaceous adhesive material which, when mixed with water, does not substantially transform itself into a gel state prior to the time that the cementitious material has set, whereby the unique property possessed by such adhesive material of migrating to the interface between the core composition and the paper may be preserved in order that the adhesive material, before any substantial portion thereof is transformed into a gel state, may be free to mix with the fibers of the paper at the points where adhesion is most needed, thus giving a very strong bond between the paper cover sheet and the cementitious core.

I would state in conclusion, that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A wallboard having a relatively light-weight gypsum core and a paper liner, said core comprising a partially dextrinized farinaceous gelable adhesive material that firmly bonds the paper liner to the core.

2. In the manufacture of wall-board, the process of forming an adhesive bond between the paper cover sheets and the gypsum core which comprises mixing calcined gypsum with a partially dextrinized farinaceous gelable adhesive, forming an aqueous slurry from the mixture thus produced, and placing the slurry between the cover sheets before any substantial part of the said adhesive is transformed to a gel state.

3. The process of manufacturing wallboard which comprises the steps of mixing calcined gypsum with water, a density reducing agent and a gelable starchy adhesive a portion of which has been dextrinized, placing the resultant mixture between paper sheets, and allowing it to set and become adhered to said sheets.

4. The process of manufacturing wallboard which comprises the steps of mixing calcined gypsum with water, a gelable starchy adhesive a portion of which has been dextrinized, and with a tenacious foam, placing the resultant mixture between paper sheets, and allowing it to set and become adhered to said sheets.

5. Wallboard comprising paper sheets and a set cellular gypsum core composition therebetween, the latter having mixed therewith a gelable starchy partially dextrinized adhesive cementing said sheets to said core.

6. The process of manufacturing wallboard which comprises mixing calcined gypsum with a partially dextrinized gelable farinaceous paste in dry powdered form, wetting the resultant mixture to form a slurry, incorporating therewith a tenacious foam, feeding the resultant mass between advancing webs of paper lining sheets and permitting the mass to set therebetween and become adhered to said sheets, the process being carried out within a space of time insufficient to permit of the gelation of the farinaceous paste before the calcined gypsum has set.

7. The process of manufacturing wallboard which comprises mixing water, calcined gypsum, a tenacious foam and a dry powdered partially dextrinized gelable starchy paste to form a rapidly setting plastic mass, feeding the latter between advancing webs of paper of sufficient thickness to form a lining therefor, and allowing the mass to set therebetween, whereby the adhesive, before reaching the gel stage, will migrate to the interface between the incipiently setting mass and the paper, causing the latter to adhere to the mass.

8. A continuous process for manufacturing wallboard having a lightweight cellular core which comprises the steps of mixing dry cementitious material with a dry farinaceous material containing starch a small portion of which latter has been dextrinized, delivering the resultant mixture to a mixing belt where water is added to produce a slurry from said mixture, thereupon incorporating a tenacious foam with the slurry and delivering the slurry to a wallboard machine wherein it becomes covered by sheets of paper and sets therebetween forming a wallboard.

9. Wallboard comprising paper sheets and a set cellular gypsum core composition adhered thereto by means of a gelable starchy partially dextrinized adhesive which has partially migrated from the core to the interface between the core and the paper sheets.

CARLISLE K. ROOS.